(12) United States Patent
Chen et al.

(10) Patent No.: US 10,709,291 B2
(45) Date of Patent: Jul. 14, 2020

(54) TILTABLE COOKING DEVICE FOR MAKING WAFFLES AND THE LIKE

(71) Applicant: TSANN KUEN (ZHANGZHOU) ENTERPRISE CO., LTD., Zhangzhou (CN)

(72) Inventors: Dongmei Chen, Zhangzhou (CN); Yixin Zhan, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 302 days.

(21) Appl. No.: 15/868,413

(22) Filed: Jan. 11, 2018

(65) Prior Publication Data

US 2018/0206674 A1 Jul. 26, 2018

(30) Foreign Application Priority Data

Jan. 26, 2017 (CN) .......................... 2017 1 0061626

(51) Int. Cl.
*A47J 37/06* (2006.01)
(52) U.S. Cl.
CPC ................................ *A47J 37/0611* (2013.01)

(58) Field of Classification Search
CPC ....... A47J 37/0611; A47J 37/10; A47J 37/108
See application file for complete search history.

(56) References Cited

U.S. PATENT DOCUMENTS

2005/0139086 A1* 6/2005 McHutchison ...... A47J 37/0611 99/389
2007/0283821 A1* 12/2007 May ..................... A47J 37/0611 99/372

* cited by examiner

*Primary Examiner* — Jason L Vaughan
*Assistant Examiner* — Amanda Kreiling
(74) *Attorney, Agent, or Firm* — Michael Best & Friedrich LLP

(57) ABSTRACT

A cooking device includes a lower grill unit having a lower grill surface, and an upper grill unit cooperating with the lower grill surface to define a cooking space. A support member includes a pivoting end portion pivotally connected to the lower grill unit, and a supporting end portion opposite to the pivoting end portion. The support member is operable to move between a folded state, where the supporting end portion is received in the lower grill unit so that the latter can be horizontally placed on a flat surface, and an unfolded state, where the supporting end portion is pivoted downwardly and forwardly relative to and cooperating with the lower grill unit to obliquely support the cooking device on the flat surface.

7 Claims, 5 Drawing Sheets

TILTABLE COOKING DEVICE FOR MAKING WAFFLES AND THE LIKE

CROSS-REFERENCE TO RELATED APPLICATION

This application claims priority to Chinese Patent Application No. 201710061626.7, filed on Jan. 26, 2017.

FIELD

The disclosure relates to a food processing device, more particularly to a tiltable cooking device for making waffles and the like.

BACKGROUND

Referring to FIG. 1, a conventional cooking device for making waffles and the like includes a base 11, a lower grill unit 12 having front and rear ends pivotally connected to the base 11 and rotatable relative to the base 11 in a left-right direction, and an upper grill unit 13 having a rear end pivotally connected to the lower grill unit 12 and openably covering the lower grill unit 12. The lower and upper grill units 12, 13 cooperate with each other to define a cooking space 14 therebetween, and a feed inlet 141 at left side thereof.

To use the aforesaid conventional cooking device, the upper grill unit 13 is first moved to cover the lower grill unit 12, after which the lower grill unit 12 is rotated until the feed inlet 141 faces upward. A batter is then poured into the feed inlet 141 to fill the cooking space 14 for making a waffle 15. Although the aforesaid conventional cooking device can achieve its intended purpose, it must be provided with the base 11 and other components, so that the volume thereof is large. Thus, the conventional cooking device occupies a substantial space. In view of the cost, storage and transport thereof, there is still room for improvement of the aforesaid conventional cooking device.

SUMMARY

Therefore, an object of the present disclosure is to provide a tiltable cooking device for making waffles and the like that is capable of alleviating at least one of the drawbacks of the prior art.

According to one aspect of this disclosure, a cooking device for making waffles and the like includes a lower grill unit having a lower grill surface, an upper grill unit pivotally connected to and openably covering the lower grill unit, and a support member. The upper grill unit cooperates with the lower grill surface to define a cooking space, and has a feed passage located at a front side thereof and communicating with the cooking space for entry of a food material into the cooking space. The support member includes a pivoting end portion pivotally connected to the lower grill unit, and a supporting end portion opposite to the pivoting end portion. The support member is operable to move between a folded state, where the supporting end portion is received in the lower grill unit so that the lower grill unit can be horizontally placed on a flat surface, and an unfolded state, where the supporting end portion is pivoted downwardly and forwardly relative to the lower grill unit, and cooperates with the lower grill unit to obliquely support the cooking device on the flat surface.

According to another aspect of this disclosure, a cooking device for making waffles and the like includes a lower grill unit, an upper grill unit pivotally connected to and openably covering the lower grill unit, and a support member pivotally connected to the lower grill unit. The upper grill unit cooperates with the lower grill unit to define therebetween a cooking space, and has a feed passage communicating with the cooking space for entry of a food material into the cooking space. The support member is operable to move between a folded state, where the support member is received in the lower grill unit so that the lower grill unit can be horizontally placed on a flat surface, and an unfolded state, where the support member is pivoted downwardly and forwardly relative to the lower grill unit, and cooperates with the lower grill unit to obliquely support the cooking device on the flat surface. The feed passage is configured to permit entry of the food material into the cooking space in a direction perpendicular to the flat surface when the support member is in the unfolded state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
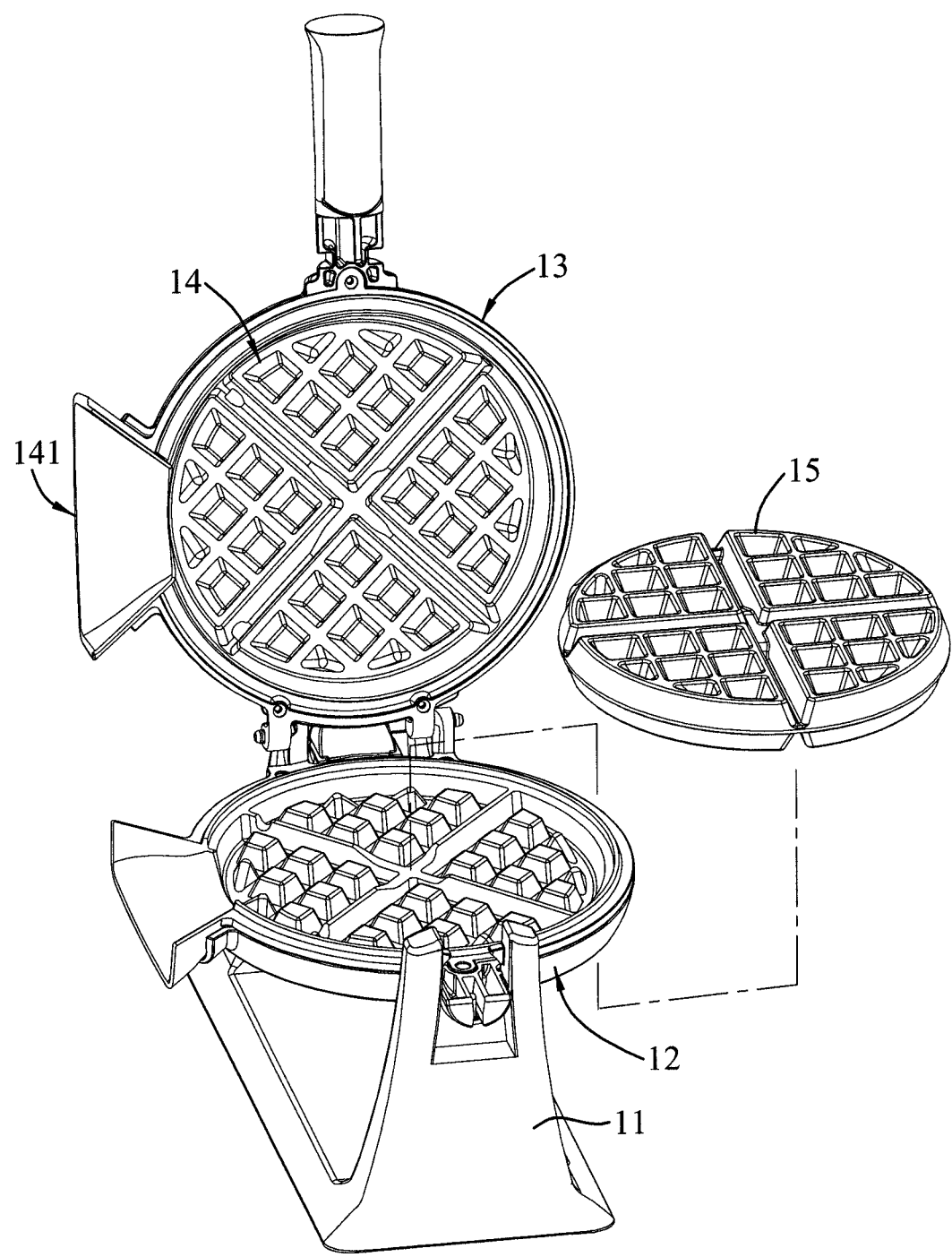
FIG. 1 is a perspective view of a conventional cooking device.
Figure 2:
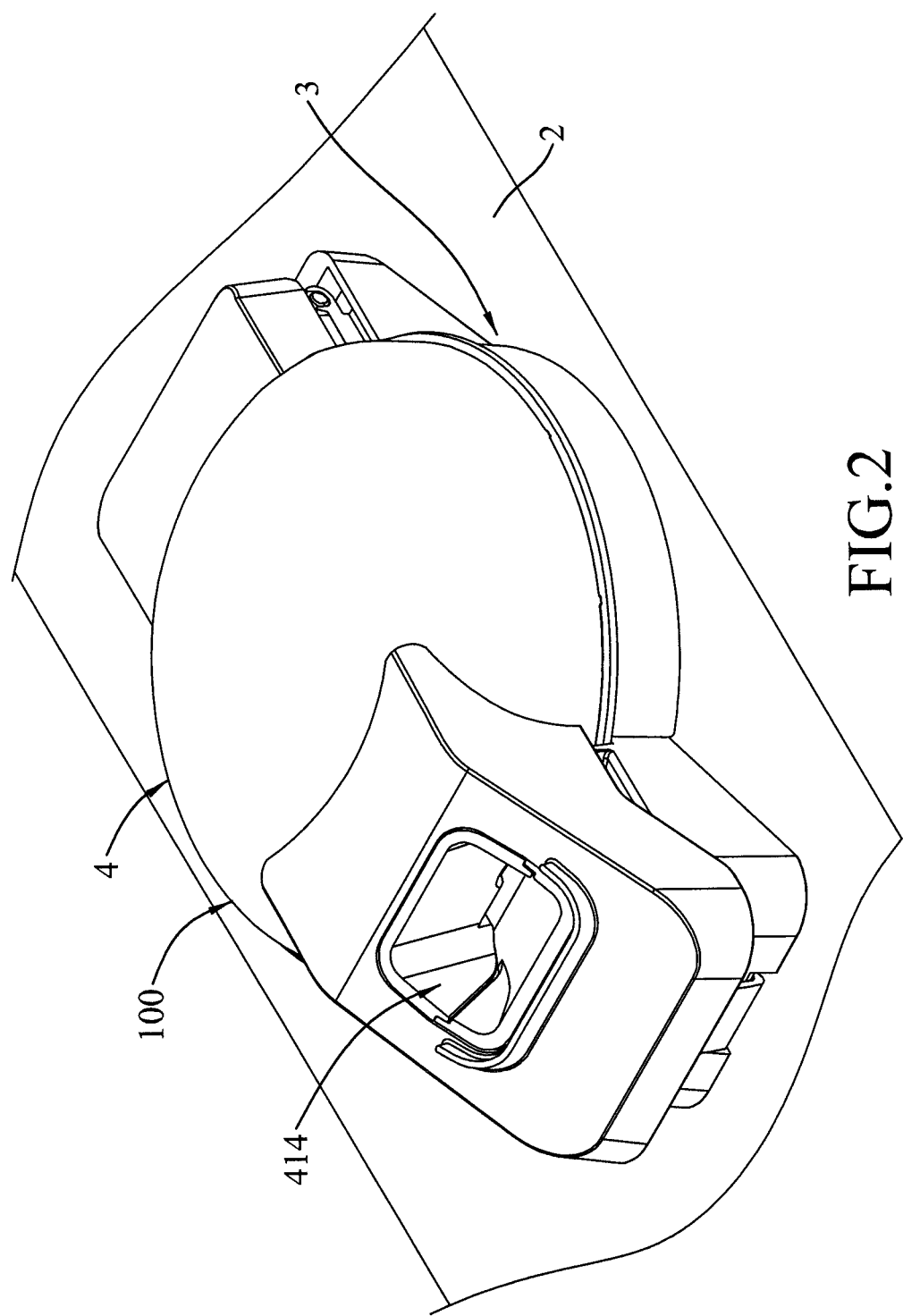
FIG. 2 is a perspective view of a tiltable cooking device according to the embodiment of the present disclosure being horizontally placed on a flat surface.

Referring to FIGS. 2 to 5, a tiltable cooking device 100 according to the embodiment of the present disclosure is capable of being horizontally disposed on a flat surface 2, and comprises a lower grill unit 3, an upper grill unit 4, and a support member 5. The cooking device 100 is suitable for used in making food from a food material. In this embodiment, the food material used is batter for making food, such as muffins, waffles and the like. The flat surface 2 may be, for example, a top surface of a table.

The lower grill unit 3 includes a lower housing 31, a lower grill plate 32 disposed on the lower housing 31, and a lower heating tube 33 disposed between the lower housing 31 and the lower grill plate 32.

The lower housing 31 has a first rear end portion 311, a first front end portion 312 opposite to the first rear end portion 311, and a receiving groove 315 formed between the first front end portion 312 and the first rear end portion 311. The first rear end portion 311 has a supporting surface 313 extending obliquely, downwardly and forwardly therefrom. The receiving groove 315 has a generally T-shape.

The lower grill plate 32 has a lower grill surface 321 facing the upper grill unit 4.

The upper grill unit 4 includes an upper housing 41, an upper grill plate 42 disposed on a bottom side of the upper housing 41, and an upper heating tube 43 disposed between the upper housing 41 and the upper grill plate 42.

The upper housing 41 has a second rear end portion 411, a second front end portion 412 opposite to the second rear end portion 411, and a feed passage 413 formed in the upper housing 41 proximate to the second front end portion 412 and having a feed inlet 414 formed in an outer surface of the second front end portion 412. The second rear end portion 411 is pivotally connected to the first rear end portion 311 so that the upper housing 41 can be pivoted to openably cover the lower housing 31. The feed inlet 414 faces forward and upward for entry of batter (not shown).

The upper grill plate 42 has an upper grill surface 421 cooperating with the lower grill surface 321 to define therebetween a cooking space 6 communicating with the feed passage 413 through a feed outlet (not shown) thereof.

The support member 5 is pivotally disposed in the receiving groove 315, and extends in a front-rear direction. The support member 5 includes a pivoting end portion 51, a supporting end portion 52 opposite to the pivoting end portion 51, and a connecting portion 53 connected between the pivoting end portion 51 and the supporting end portion 52. The pivoting end portion 51 is pivotally connected to a groove sidewall of the receiving groove 315 in proximity to the first front end portion 312. The supporting end portion 52 cooperates with the connecting portion 53 to form a generally T-shape. The supporting end portion 52 can be pivoted downward and away from the receiving groove 315 through the pivoting end portion 51, and has a horizontal width (W1) larger than a horizontal width (W2) of the connecting portion 53.

Figure 3:
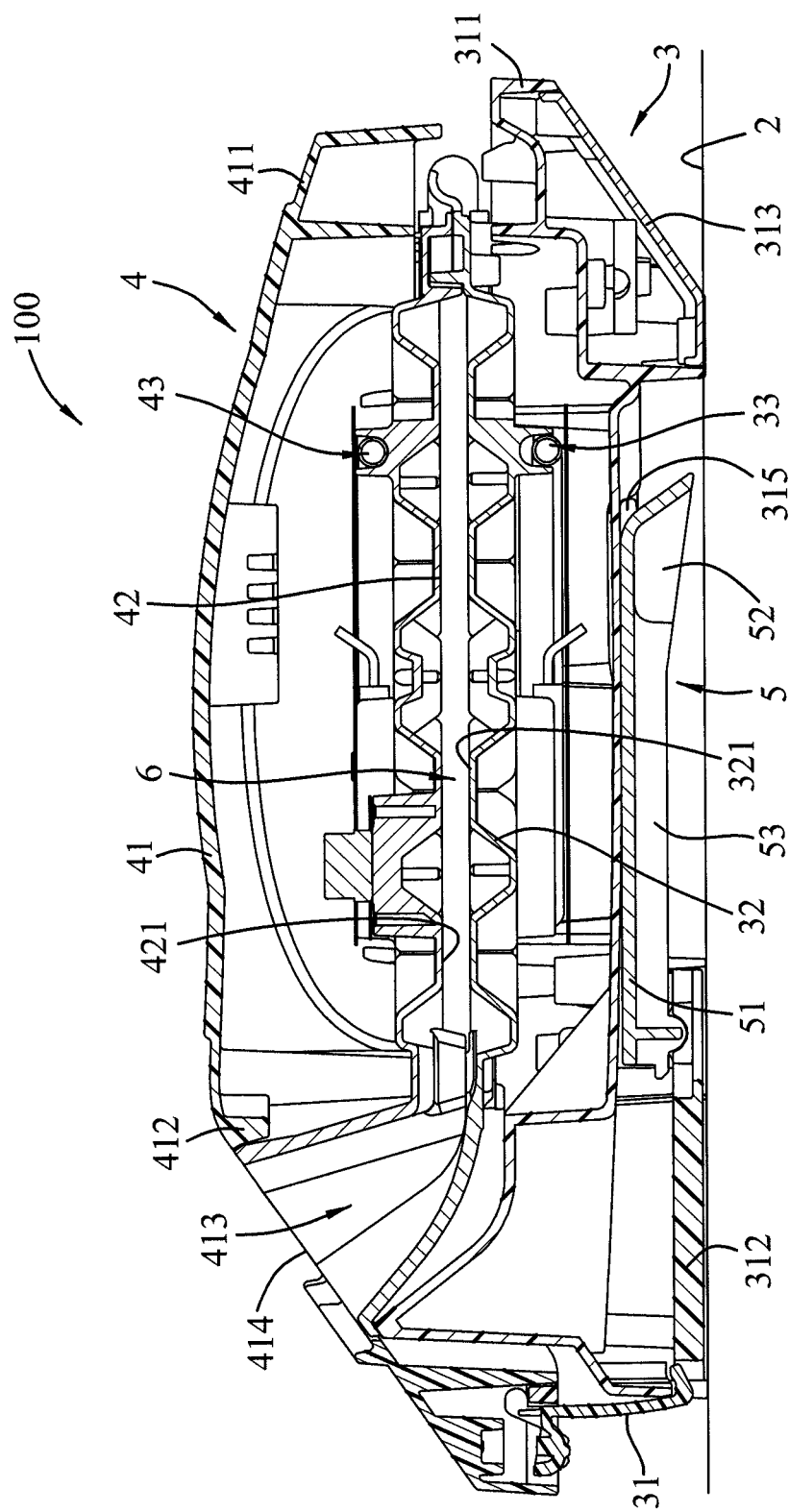
FIG. 3 is a sectional view of the embodiment.
Figure 4:
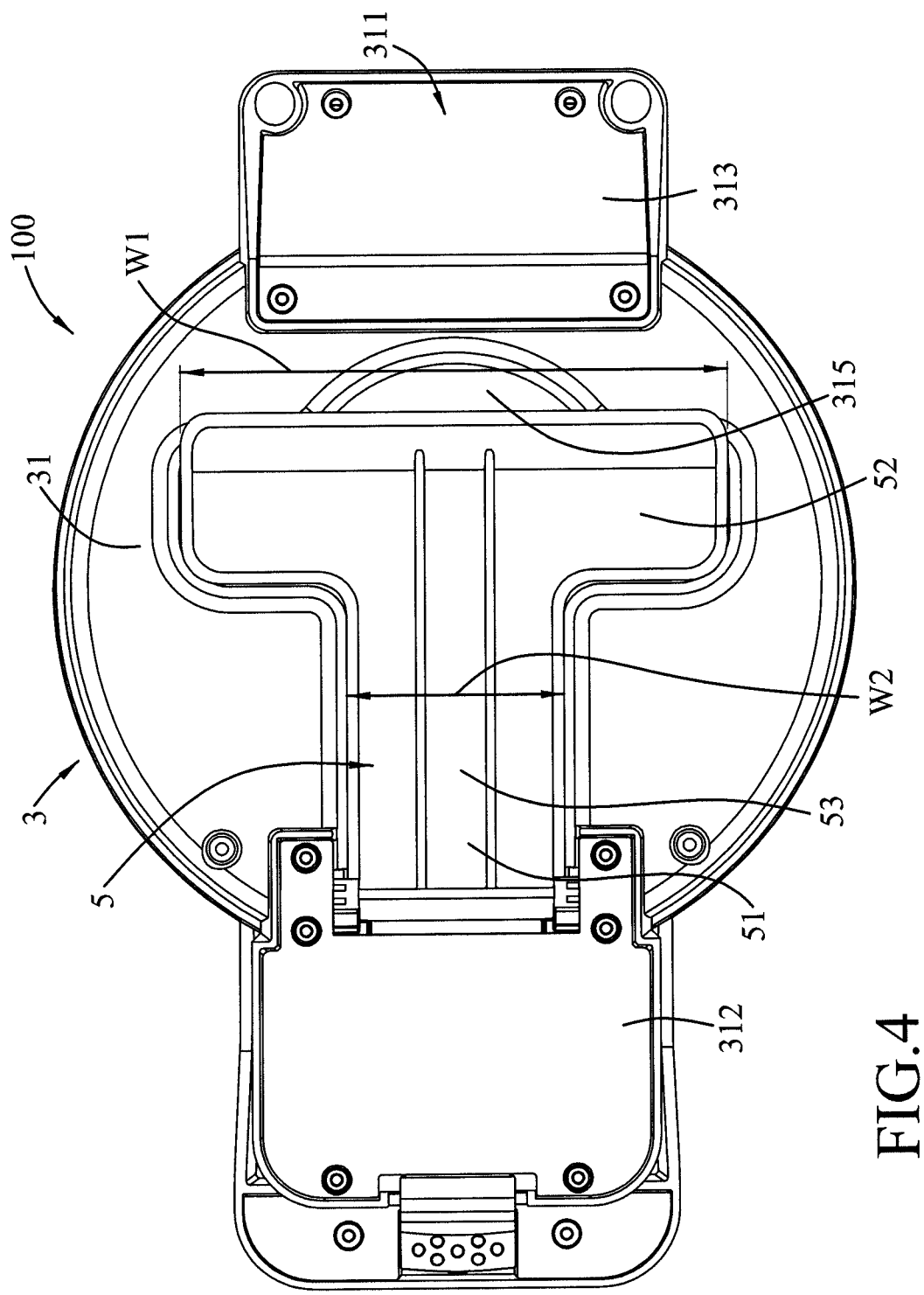
FIG. 4 is a bottom view of the embodiment, illustrating a support member in a folded state and received in a lower housing.
Figure 5:
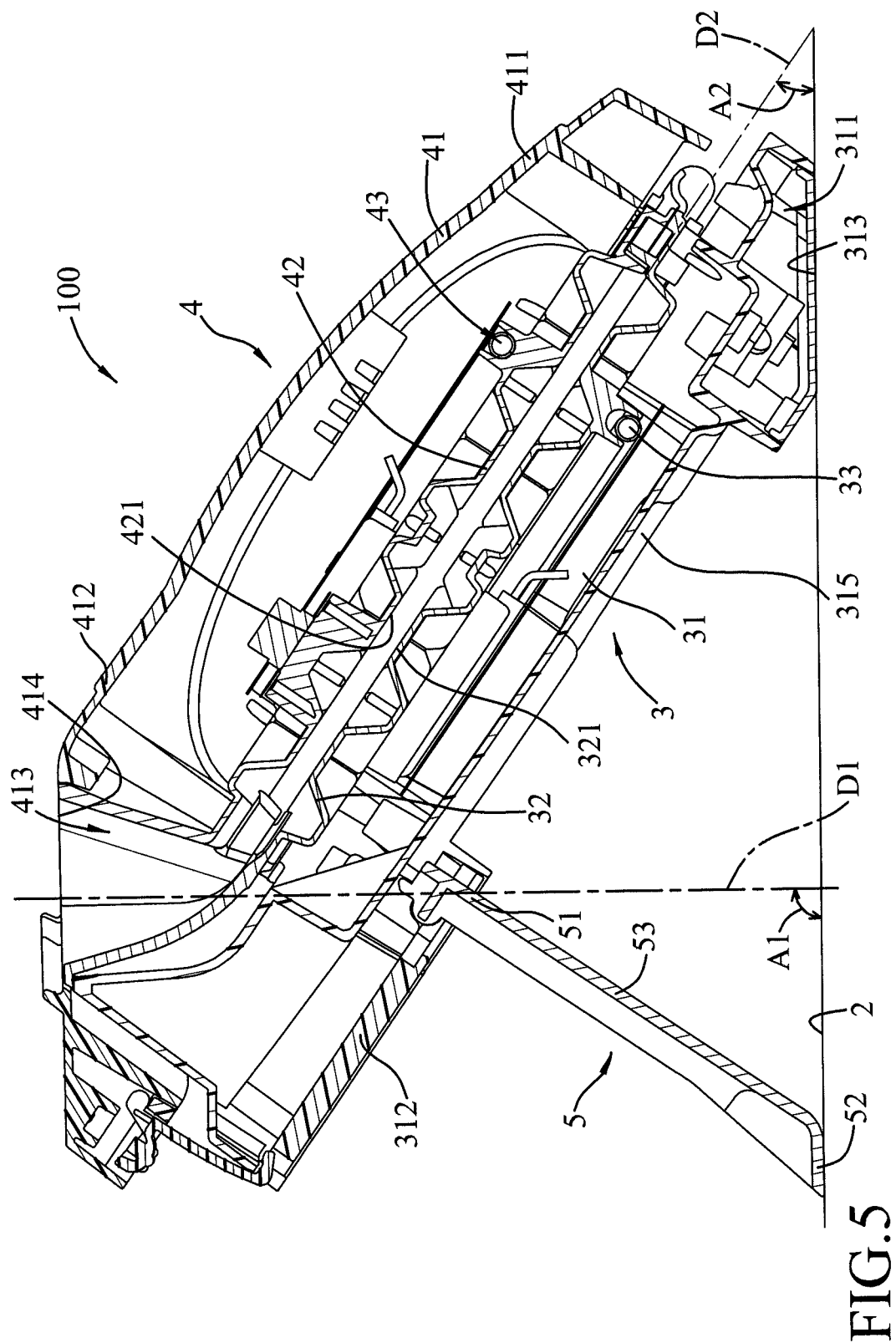
FIG. 5 is another sectional view of the embodiment, illustrating the support member in an unfolded state and cooperating with the lower housing to obliquely support the tiltable cooking device on the flat surface.

The support member 5 is rotatable between a folded state, as shown in FIG. 3, and an unfolded state, as shown in FIG. 5. In the folded state, the support member 5 is received in the receiving groove 315 of the lower housing 31, and has a top side abutting against the lower housing 31. The first rear end portion 311 and the first front end portion 312 of the lower grill unit 3 cooperate with each other to horizontally support the cooking device 100 on the flat surface 2. The lower grill surface 321 and the upper grill surface 421 extend along a horizontal direction parallel to the flat surface 2.

By virtue of the pivot connection between the pivoting end portion 51 of the support member 5 and the first front end portion 312 of the lower housing 31, the connecting portion 53 and the supporting end portion 52 can be pivoted downwardly and forwardly relative to the lower housing 31 away from the receiving groove 315 so as to shift the support member 5 from the folded state to the unfolded state, as shown in FIG. 5. In the unfolded state, the supporting surface 313 of the first rear end portion 311 cooperates with the supporting end portion 52 of the support member 5 to obliquely support the cooking device 100 on the flat surface 2. At this time, the lower housing 31 is tilted upright on the flat surface 2 such that the first front end portion 312 is higher than the first rear end portion 311 and such that the lower grill surface 321 is inclined upwardly and rearwardly relative to the flat surface 2. Further, an extending direction (D1) of the feed passage 413 cooperates with the flat surface 2 to define a feed angle (A1) of 90 degrees, while an extending direction (D2) of the lower grill surface 321 cooperates with the flat surface 2 to define a grilling angle (A2) of about 35 degrees. Moreover, the feed outlet of the feed passage 413 communicates with a front side of the cooking space 6, and the feed inlet 414 faces upward.

When not in use, the cooking device 100 of this embodiment is disposed in a state, as shown in FIG. 3. In this state, the volume of the cooking device 100 is small and does not occupy a substantial space, so that the cooking device 100 is easy to transport and store. In use, for example, for making a waffle from batter, the cooking device 100 is disposed in a state, as shown in FIG. 5. In this state, the batter is poured through the feed inlet 414 to flow through the feed passage 413 into the cooking space 6, and moves downward by gravity along the lower grill surface 321 to gradually fill the cooking space 6. Since the batter can simultaneously contact the lower grill surface 321 and the upper grill surface 421 during its downward movement, the waffle made by the cooking device 100 of this embodiment will have two sides uniformly cooked. The communication between the feed passage 413 and the top side of the cooking space 6 can aid in discharge of moisture in the batter during the cooking process, so that the waffle made by this embodiment will have a dense and firm texture. Furthermore, because the horizontal width (W1) of the supporting end portion 52 of the support member 5 is larger than the horizontal width (W2) of the connecting portion 53 thereof, the supporting end portion 52 can stably stand on the flat surface 2 when the support member 5 is unfolded.

In other variations of this embodiment, the feed angle (A2) may range from 75 to 105 degrees, while the grilling angle (A1) may range from 20 to 65 degrees. The coordination between the feed angle (A2) and the grilling angle (A1) has the advantage of facilitating quick feeding of the batter into the cooking space 6 via the feed passage 413 in a direction substantially perpendicular to the flat surface 2, and problems pertaining to the unreasonable extending direction (D1 of the feed inlet 414 will not occur so that there is no need for addition of complicated auxiliary structures to the cooking device 100. Thus, the manufacturing cost of the cooking device 100 can be saved.

In sum, through the support member 5 that is pivotable relative to the lower grill unit 3 between the folded state, in which the support member 5 can be folded and stored in the receiving groove 315 of the lower grill unit 3, and the unfolded state, in which the support member 5 is pivoted out of the receiving groove 315, the cooking device 100 of this disclosure can be supported in a tilted manner, so that the lower grill surface 321 is inclined upwardly and rearwardly relative to the flat surface 2 to facilitate pouring and cooking of the batter. After the cooking is completed, the support member 5 is pivoted back into the receiving groove 315 so as to reduce the volume of the cooking device 100, so that the cooking device 100 does not occupy a substantial space, and is easy to transport and store. Further, the cooking device 100 has a simple structure, so that the manufacturing cost thereof is low.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A cooking device, comprising:
a lower grill unit having a lower grill surface, a first rear end portion, and a first front end portion opposite to said first rear end portion;
an upper grill unit pivotally connected to and openably covering said lower grill unit, said upper grill unit cooperating with said lower grill surface to define a cooking space, said upper grill unit having a feed passage located at a front side thereof and communicating with said cooking space for entry of a food material into said cooking space; and a support member including a pivoting end portion pivotally connected to said first front end portion, and a supporting end portion opposite to said pivoting end portion, said support member being operable to move between a folded state, where said supporting end portion is received in said lower grill unit so that said lower grill unit can be horizontally placed on a flat surface, and an unfolded state, where said supporting end portion is pivoted downwardly and forwardly relative to said lower grill unit;

wherein said upper grill unit further has a second rear end portion pivotally connected to said first rear end portion, and a second front end portion opposite to said second rear end portion; and wherein, when said support member is in the unfolded state, said first rear end portion cooperates with said supporting end portion of said support member to obliquely support said cooking device on the flat surface, and said first front end portion is supported by said pivoting end portion and is located upwardly away from the flat surface so as to be disposed higher than said first rear end portion and so as to incline said lower grill surface upwardly and rearwardly relative to the flat surface.

2. The cooking device as claimed in claim 1, wherein said lower grill unit includes a lower housing having said first front end portion and said first rear end portion, and a lower grill plate disposed on said lower housing and having said lower grill surface, said first rear end portion having a supporting surface extending obliquely, downwardly and forwardly therefrom, said supporting surface being configured to abut against the flat surface when said support member is in the unfolded state.

3. The cooking device as claimed in claim 1, wherein said upper grill unit includes an upper housing having said second front end portion and said second rear end portion, said feed passage being formed in said upper housing proximate to said second front end portion, and having a feed inlet formed in an outer surface of said second front end portion, and wherein, when said support member is in the unfolded state, an extending direction of said feed passage is configured to cooperate with the flat surface to define a feed angle that ranges from 75 to 105 degrees, and an extending direction of said lower grill surface is configured to cooperate with the flat surface to define a grilling angle that ranges from 20 to 65 degrees.

4. The cooking device as claimed in claim 1, wherein said support member further includes a connecting portion connected between said pivoting end portion and said supporting end portion, and said supporting end portion has a horizontal width larger than a horizontal width of said connecting portion.

5. A cooking device, comprising:

a lower grill unit including a first rear end portion, a first front end portion opposite to said first rear end portion, and a lower grill surface facing upward;

an upper grill unit pivotally connected to and openably covering said lower grill unit, said upper grill unit cooperating with said lower grill surface to define therebetween a cooking space, said upper grill unit having a second rear end portion pivotally connected to said first rear end portion, and a second front end portion opposite to said second rear end portion, said second front end portion being formed with a feed passage communicating with said cooking space for entry of a food material into said cooking space; and a support member pivotally connected to said lower grill unit, said support member being operable to move between a folded state, where said support member is received in said lower grill unit so that said lower grill unit can be horizontally placed on a flat surface, and an unfolded state, where said support member is pivoted downwardly and forwardly relative to said lower grill unit;

wherein said feed passage is configured to permit entry of the food material into said cooking space in a direction perpendicular to the flat surface when said support member is in the unfolded state;

wherein said support member includes a pivoting end portion pivotally connected to said first front end portion, and a supporting end portion opposite to said pivoting end portion and movable downwardly and forwardly relative to said lower grill unit; and wherein, when said support member is in the unfolded state, said first rear end portion cooperates with said supporting end portion to obliquely support said cooking device on the flat surface, and said first front end portion is supported by said pivoting end portion and is located upwardly away from the flat surface so as to be disposed higher than said first rear end portion and so as to incline said lower grill surface upwardly and rearwardly relative to the flat surface.

6. The cooking device as claimed in claim 5, wherein said lower grill unit includes a lower housing having said first front end portion and said first rear end portion, and a lower grill plate disposed on said lower housing and having said lower grill surface, said first rear end portion having a supporting surface extending obliquely, downwardly and forwardly therefrom, said supporting surface being configured to abut against the flat surface when said support member is in the unfolded state.

7. The cooking device as claimed in claim 5, wherein said feed passage has a feed inlet formed in an outer surface of said second front end portion, and wherein, when said support member is in the unfolded state, an extending direction of said feed passage is configured to cooperate with the flat surface to define a feed angle that ranges from 75 to 105 degrees, and an extending direction of said lower grill surface is configured to cooperate with the flat surface to define a grilling angle that ranges from 20 to 65 degrees.

* * * * *